May 23, 1967  D. W. VAN DOORN  3,320,640
SYSTEM FOR SUPPLYING SEED COTTON TO GINS
Filed July 23, 1965  2 Sheets-Sheet 1
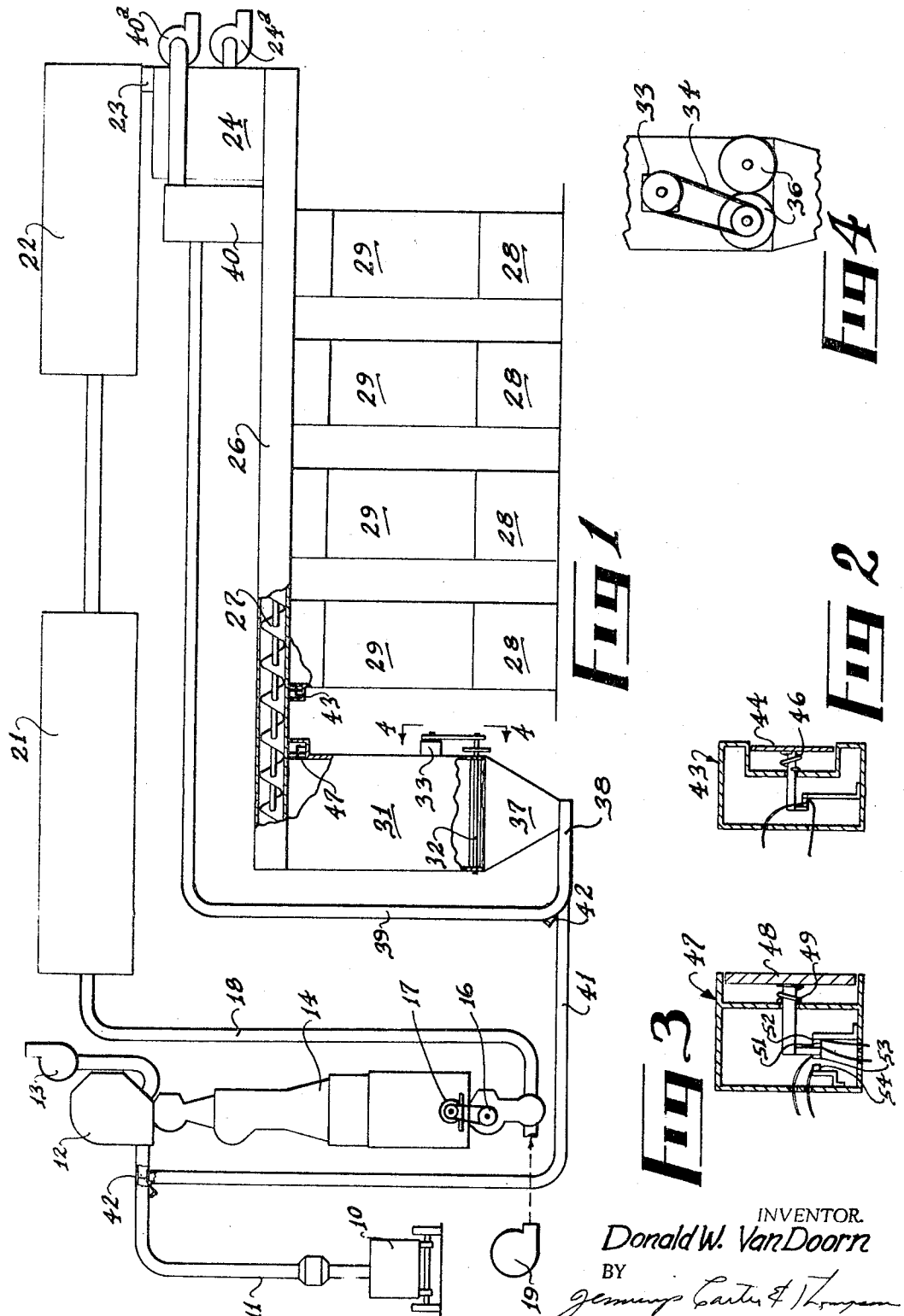
INVENTOR.
Donald W. Van Doorn
BY
Jennings Carter & Thompson
Attorneys May 23, 1967  D. W. VAN DOORN  3,320,640
SYSTEM FOR SUPPLYING SEED COTTON TO GINS
Filed July 23, 1965  2 Sheets-Sheet 2

INVENTOR.
Donald W. Van Doorn
BY
Jennings Carter & Thompson
Attorneys

United States Patent Office 3,320,640
Patented May 23, 1967

3,320,640
SYSTEM FOR SUPPLYING SEED COTTON TO GINS
Donald W. Van Doorn, Columbus, Ga., assignor to Lummus Cotton Gin Company, a corporation of Georgia
Filed July 23, 1965, Ser. No. 474,330
9 Claims. (Cl. 19—64.5)

This invention relates to a system for supplying seed cotton to the gin stand feeders.

In this art seed cotton customarily is pneumatically conveyed by suction through overhead cleaners, driers or moistening equipment, depending upon the condition of the cotton, and thence by overhead distributing mechanism to the individual feeders for the gins. As is known, ginning systems generally embody a plurality of gin stands, usually two to five, the feeders of which are supplied by a common overhead conveyor-distributor. Thus, the cotton is fed to one end of the distributor and passes across the tops of the feeders whereby each feeder receives a portion of the stream being moved along by the distributor, thus to maintain it filled. At the end of the last gin, that is, the gin last to receive cotton from the conveyor-distributor, there is placed an overflow hopper or pen into which is delivered the cotton in excess of that required to keep the feeders filled. Heretofore, the cotton in the overflow hopper or pen, by manual control and essentially by guesswork, was re-fed to the inlet end of the conveyor-distributor again to be delivered to the feeders for the gins, this re-feeding continuing until all of the cotton in a given wagon or batch was ginned. This procedure has resulted in haphazard handling of the flow of cotton, resulting in overloading parts of the system while starving other parts, whereby total ginning time for a given wagon load or batch is increased. Further, when insufficient cotton is fed to a gin the seed roll therein becomes loose, resulting in poor quality sample from such gin. Too much recirculation through the overhead mechanisms results in "machining" and often overdrying of the cotton, also decreasing the quality of the ginned staple. In addition, manual operation of the overflow hopper is expensive.

In view of the foregoing a prime object of my invention is to eliminate the labor and time lost from manually controlling such feed systems and to eliminate the recirculation of cotton as done in some prior systems.

Specifically, an object is to provide means associated with the feeder over the gin just ahead of the overflow hopper effective to sense the presence thereat of less than a sufficient amount of cotton to supply its gin, together with means associated with the storage hopper responsive to such sensing means to return to the conveyor distributor any excess cotton which may have been delivered to the overflow hopper.

Another object is to provide means associated with the overflow hopper effective temporarily to stop the delivery of additional cotton from the wagon to the overhead mechanism when the hopper becomes full, or is filled to more than a predetermined amount while the overflow hopper feeds out some of the accumulated cotton.

A further object is to provide a time responsive variable feed rate mechanism for the overflow hopper effective to prevent oversupplying the conveyor-distributor from the overflow hopper upon an indication of the absence of cotton at the last gin feeder.

Apparatus illustrating features of my invention is shown in the accompanying drawings, forming a part hereof, in which:

FIG. 1 is a wholly diagrammatic view, partly broken away and in section, and illustrating my improved system;

FIG. 2 is a detailed sectional view of a form of switch constituting a cotton sensing means in the feeder for the last gin;

FIG. 3 is a view similar to FIG. 2 illustrating a form of sensing means in the form of a switch which may be associated with the overflow hopper;

FIG. 4 is a fragmental detail view illustrating the drive for the feed rollers of the storage hopper and taken generally along line 4—4 of FIG. 1;

Figure 5:
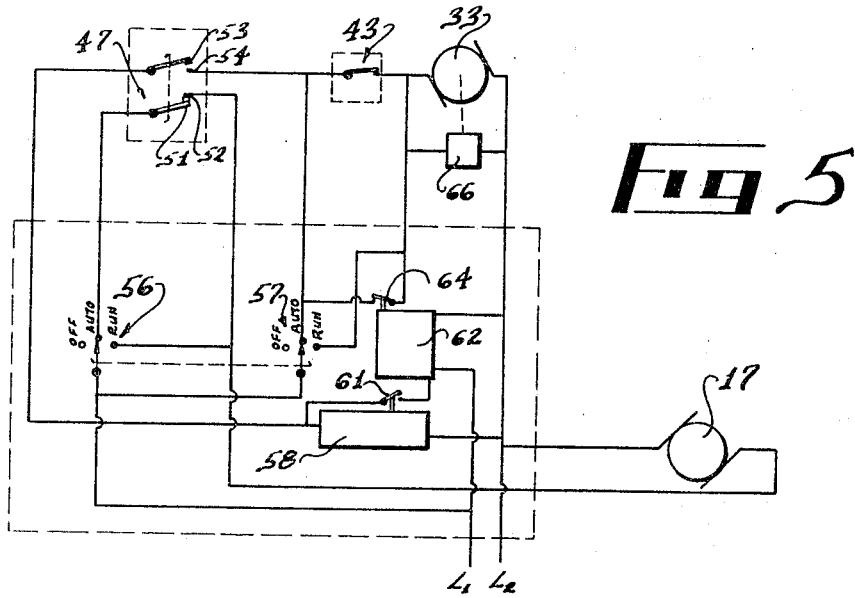
FIG. 5 is a wiring diagram.

Referring now to the drawings for a better understanding of my invention, it will be understood that cotton generally is delivered to the gin house by wagons, trucks or the like illustrated diagrammatically at 10. An operator manipulates the suction telescope 11 so that the cotton is pneumatically conveyed by suction into the gin house and into a separator indicated generally at 12. A suction fan 13 provides the conveying air movement between telescope and separator and aids in drawing away from the cotton a certain amount of trash, leaves, dirt and the like.

From the separator 12 the cotton falls into a suction control chamber 14 which in a sense may be described as a chamber which has a limited volume for storing the cotton. From the chamber 14 and through a drop seal feeder 16 operated by an electric motor 17 the cotton is delivered into a conduit 18. A blower 19 is connected to the conduit 18 whereby the cotton is pneumatically conveyed to the driers, extractors, cleaners and the like, two of which are indicated as being in series at 21 and 22. From the last of the driers, extractors or cleaners the cotton is delivered through the conduit 23 to a separator or hot air cleaner 24 equipped with a suction fan 24ª. From the separator 24 the cotton is delivered to a conveyor-distributor 26. It will be understood that the conveyor-distributor 26 moves the cotton from the separator 24 to the left as viewed in FIG. 1 and that it may embody a continuous flight conveyor 27.

The gins are indicated by the numeral 28. On top of each gin 28 is a feeder 29. Cotton from the conveyor-distributor is delivered to each of the feeders 29, each feeder receiving a part of the moving stream of cotton being conveyed overhead by the conveyor-distributor.

At 31 I illustrate an overflow hopper. The hopper 31 is in position at the end of the conveyor-distributor to receive any excess cotton, that is, cotton which does not fall into the feeders 29 because they are filled. The overflow hopper may have at its bottom a pair of feed rolls 32 driven by a motor 33, a suitable belt 34 and meshing gears 36 in such manner that cotton in the upper portion of the overflow hopper is delivered, when the rollers are rotating, into the lower portion 37 thereof.

From the lower portion 37 of the overflow hopper the cotton is fed into a conduit 38. Cotton in the conduit 38 may be delivered through a conduit 39 back to another separator 40 having a suction fan 40ª. For reasons later to appear I may provide a conduit 41 which leads from the conduit 38 back to the inlet of the separator 12. Plate valves or remotely controlled power operated valves 42 may be opened to permit the cotton from conduit 38 to pass through conduit 41 and into the separator 12 when it is desired to run cotton from the overflow hopper back through the entire overhead system.

Associated with the chute or hopper over the last feeder 29 of the series, that is the one nearest the overflow hopper, is an electric switch indicated generally by the numeral 43. The switch 43 may have an operating plate 44, biased outwardly by means of a spring 46 whereby the contacts of the switch 43 are normally closed. When the feeder 29 in question becomes full of cotton the cotton presses against plate 44, opening switch 43.

A somewhat similar switch indicated generally by the numeral 47 is associated with the top of the overflow hopper 31. The operating plate 48 of the switch 47 is pressed outwardly by means of a spring 49 thus to close one set of contacts 51–52 and in this position to hold open a second set of contacts 53–54.

Before describing the control circuit for my improved system a summary of the operation can now be given from what has already been said. As stated, one of the objects of my invention is automatically to assure that the feeders 29 remain full of cotton, insofar as any particular batch is concerned, while at the same time eliminating the necessity for recirculating cotton through the overhead machinery 21 and 22 (unless due to some special condition such as too much moisture it is necessary to do so.) Thus, with the cotton being fed normally to the system it is delivered to the separator 24 thence to the conveyor distributor 26, whereby the feeders 29 all receive an adequate supply of cotton for their gins 28. As soon as the last feeder 29 in the line becomes full, switch 43 opens and the excess cotton spills over into the overflow hopper 31. As later will appear from a description of the wiring diagram, opening of switch 43 deenergizes the motor 33 driving the discharge rolls 32 of the overflow hopper 31. Excess cotton thus accumulates in the overflow hopper. In view of the fact that contacts 51–52 of switch 47 are closed it is apparent that motor 17 driving the discharge rolls from the storage hopper 14 is in operation, whereby cotton continues to be fed to the overhead system 21–22. As soon as the last feeder fails to receive enough cotton to keep it filled, the spring 46 again closes switch 43. Thus, motor 33 is energized whereby the cotton which has accumulated in the hopper 31 is delivered back into the separator 40 and thence to the conveyor distributor 26. However, should there be so much excess cotton fed to the overall system as to cause the overflow hopper 31 to become filled, such condition will cause plate 48 of switch 47 to be moved to the left as viewed in FIG. 3, thus opening contacts 51–52. The opening of contacts 51–52 immediately stops the operation of motor 17, ceasing the delivery of cotton to the overhead mechanisms 21–22 and temporarily energizing the overflow hopper motor 33 feeding out the cotton from the overflow hopper 31.

Referring now particularly to FIG. 5, it will be seen that in this embodiment I provide a manual switch 56 which has three positions, automatic, off and run. This switch is under control of the operator of the gin plant. A second switch 57 is gang connected to switch 56 for a purpose to appear.

If it be assumed that the system is in full operation with the manual switches 56 and 57 set on automatic, the switch 43 is open due to the presence of cotton thereat, and contacts 51–52 of switch 47 are closed. Under these conditions the motor 33 driving the discharge rolls 32 of the overflow hopper is deenergized and motor 17 driving the drop seal feeder 16 of the storage hopper is in operation. Assuming that the overhead machinery 21–22 and the conveyor-distributor are full of cotton, it will be apparent that each of the feeders 29 likewise is full of cotton. Excess cotton which runs into the overflow hopper is held therein for retransfer through the conduit 39 to the separator 40 and thence to the conveyor-distributor without going through the overhead machinery. Such automatic retransfer takes place only when there is insufficient cotton present at the last gin feeder or when the overflow hopper is full. In circuit with the contracts 53–54 is a timer indicated diagrammatically at 58 which may be a timer manufactured by the Square D Company and called by them their Class 9050 type AO–IE timer. Immediately upon actuation of switch 47 through the circuit illustrated in FIG. 5 motor 17 is deenergized and timer 58 will time in, and after a predetermined few seconds will close switch 61 associated therewith. The closing of switch 61 energizes a second timer indicated at 62 and which may be one of the Square D Company's timers, Class 9050, type AO–ID. Immediately the timer 62 is energized its associated switch 64 is closed thus again starting the overflow hopper motor 33 whereupon cotton is discharged from the overflow hopper. As cotton discharges, switch 47 is deactivated restarting storage hopper motor 17 and deenergizing timing delay 58, opening contacts 61, deenergizing timer delay 62 which starts timing out. After a predetermined few seconds timer 62 times out opening its contact 64, stopping overflow motor 33. If during this timing cycle switch 43 has closed then motor 33 would continue to run.

It will be noted that the effect of the timing mechanisms in the circuit just explained is to prevent the feed rollers 32 of the overflow hopper from starting for a preset number of seconds after the closing of switch 47. This delay eliminates the possibility of too much cotton being fed to the conveyor-distributor at one time. Means to control the speed of motor 33 may be included in the circuit as indicated at 66, whereby the motor runs at a low speed for a few seconds immediately after being energized, and then runs at a higher speed or a gradually increasing speed to further reduce the possibility of too much cotton being fed to the conveyor distributor at one time.

It will be noted that by manipulating the gang switch 56–57 the system may be operated without my improved feeding mechanism or, if the switch is placed in the off position, the system may be controlled manually by the operator if desired.

Figure 6:
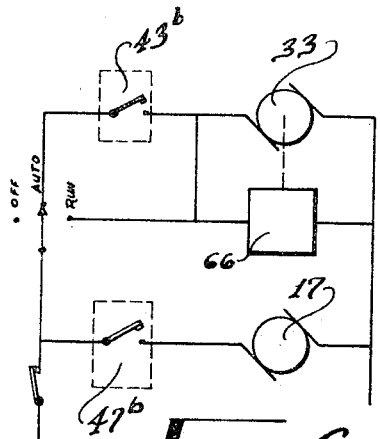
FIG. 6 is a wiring diagram of another embodiment.

In FIG. 6 I show a somewhat similar circuit which may be desirable for some applications. This circuit includes a switch 43$^b$ associated with the last feeder 29, similar to the switch 43 in the circuit just described. Also included in this circuit is a switch indicated at 47$^b$ which is associated with the top of the overflow hopper 31. The switch 43$^b$ is normally closed, being held open by the presence of cotton over the feeder 9. Similarly the switch 47$^b$ is normally closed but is opened when the cotton in the overflow hopper reaches a predetermined level. In this circuit, when the overflow hopper fills to the point that the switch 47$^b$ is actuated it simply stops the storage hopper motor 17. In the natural course of events, the last gin stand will soon not receive a full supply of cotton and the switch in the hopper over this last gin stand will close starting the overflow motor 33. Speed control means 66 may be used to control the speed of the motor 33 whereby it starts at a relatively slow speed which increases gradually over a period of time. Activation of motor 33 will feed out the cotton in the overflow hopper. When the cotton in the overflow hopper has been reduced below the predetermined level, switch 47$^b$ closes and motor 17 of the storage hopper will begin to run, feeding cotton into the overhead system. When a sufficient amount of cotton is being supplied to the last feeder 29 switch 43$^b$ opens stopping motor 33, returning the system to its original state.

In the event that insufficient amount of cotton is being supplied to fill the last feeder 29, switch 43$^b$ will close thereby activating the overflow motor 33. Thus, cotton is fed from the overflow hopper into the system through conduits 38 and 39 and separator 40 in addition to the cotton being fed to the system from the wagon 10.

Figure 7:
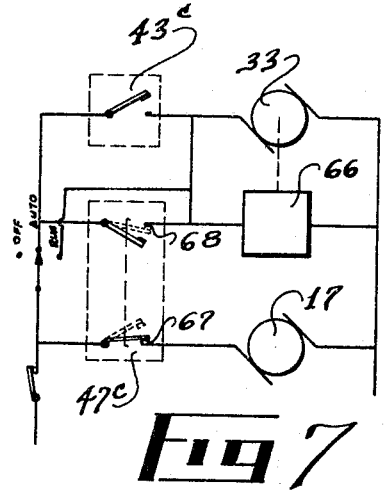
FIG. 7 is a wiring diagram of still another embodiment.

In FIG. 7 I show still another circuit which may be employed to carry out my invention. This embodiment differs from that illustrated in FIG. 6 in that the switch 47$^c$ in the overflow hopper 31 has two sets of contacts 47$^c$ ganged together such that when one set, say 67, is closed the other set 68 is open. The circuit also includes a switch 43$^c$ associated with the last feeder 29. In the operation of this circuit when the cotton in the overflow hopper reaches the level to activate switch 47c contacts 67 open and contacts 68 close, as indicated in dotted lines, thus stopping storage hopper motor 17 while at the same time starting overflow hopper 33. Again, speed control means 66 may be used to control the speed of the motor 33 as described hereinabove. When the level of the cotton in the storage hopper 31 is reduced so that switch 47c is deactivated, contacts 68 open and contacts 67 close thus to return the circuit to its original state. In the event that insufficient cotton was being supplied to the feeder 29, either while the level of the cotton in the overflow hopper 31 is being reduced or when it does not need to be reduced, switch 43c closes to activate motor 33 thus to feed the cotton out of the hopper 31 and into the system.

From the foregoing it will be apparent that I have devised an improved system for handling seed cotton in a gin system. In actual practice my invention has proved to be satisfactory in every way and the over-machining of the cotton as well as eliminating the time loss required for cotton to make a complete circuit through all the apparatus as heretofore has been the practice is eliminated.

It will be understood that with the manual switch set on automatic at the beginning of the trailer load the feed rolls of the overflow hopper are turning because the switch in the hopper over the last gin stand detects no cotton present at that point. As cotton is fed from the trailer, it flows through the overhead machinery and comes into the conveyor-distributor. The feed rollers of the incoming feed hopper are normally set to feed a good percentage more cotton to the overhead system than can be consumed by the gin stands once the full flow has been established. This is done to enable all of the gin stands to get into operation as soon as possible. Soon, all of the gin stands will be supplied with cotton and the switch at the discharge end of the last gin stand will be opened and the feed rollers of the overflow hopper therefore will stop turning. Shortly thereafter, some cotton will pass from the discharge end of the conveyor-distributor and accumulate over the feed rollers in the overflow hopper. This cotton will continue to build up, but on a normal size trailer will not build up to the point that the switch 47 in the overflow hopper is actuated. As the end of the cotton in the trailer is reached, the volume of flow through the overhead machinery begins to taper off and soon the last gin stand is not fully fed with cotton. The switch in the discharge end of the hopper over this last gin stand detects the absence of cotton and the feed rollers of the overflow hopper 31 commence to turn, feeding out the cotton that has accumulated in the hopper without the need of any operator attention and without the loss of any time.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. The combination with a cotton gin and a feed mechanism for delivering seed cotton to the gin of,
   (a) normally energized means to deliver seed cotton to the feed mechanism,
   (b) an overflow chamber disposed to receive from the feed mechanism cotton in excess of that needed to supply the gin,
   (c) normally energized means associated with the overflow chamber for releasing therefrom for return to the feed mechanism said excess cotton in said overflow chamber, and
   (d) cotton actuated control means associated with the feed mechanism effective upon the presence therein of more than a predetermined amount of cotton to deenergize the said means associated with the overflow chamber, whereby excess cotton in the chamber is held therein until less than said predetermined amount of cotton is present at the feed mechanism.

2. Apparatus as defined in claim 1 in which there is means associated with the overflow chamber effective upon the presence therein of more than a predetermined amount of cotton therein to deenergize the means for delivering cotton to the feed mechanism, thereby to stop delivery of cotton to the feed mechanism.

3. In a cotton ginning system embodying a plurality of gins to which seed cotton is fed from a feed mechanism,
   (a) an overflow hopper to which cotton in excess of that required to feed the last of said gins is delivered,
   (b) normally motorized means associated with the overflow hopper disposed to discharge cotton from the hopper for return to the feed mechanism, and
   (c) sensing means associated with that part of the feed mechanism delivering to the last gin and operable to deenergize the motorized discharge means associated with the overflow hopper upon the presence of a predetermined amount of cotton in the feed means for the last gin.

4. In a cotton ginning system,
   (a) a plurality of cotton gins,
   (b) feed mechanism for passing a stream of cotton in series over the gins thus to maintain the gins fully supplied,
   (c) an overflow hopper for receiving excess cotton from said stream,
   (d) normally energized motorized means for discharging cotton from the hopper for delivery to the feed mechanism, and
   (e) means associated with the feed mechanism for the gin last receiving cotton from said stream and effective upon the presence thereat of more than a predetermined amount of cotton to deenergize the discharge means of the overflow hopper.

5. Apparatus as defined in claim 4 in which the means associated with the feed mechanism is also effective to reenergize the cotton discharge means of the overflow hopper when there is less than said predetermined amount of cotton in the feed mechanism for the last gin.

6. Apparatus as defined in claim 4 including means to deliver seed cotton to the feed mechanism and means effective upon the presence of more than a predetermined amount of cotton in the overflow hopper to cut off the supply of cotton to the feed mechanism.

7. In a cotton ginning system,
   (a) a plurality of cotton gins,
   (b) cotton conditioning mechanism,
   (c) means to deliver seed cotton to said cotton conditioning mechanism,
   (d) feed mechanism for passing a stream of cotton from said conditioning mechanism to and in series over said gins thus to supply cotton to the gins,
   (e) an overflow hopper for receiving cotton passed from said conditioning mechanism in excess to that required to supply the gins,
   (f) normally energized means for discharging cotton from the overflow hopper for delivery to the feed mechanism, and
   (g) means associated with the feed mechanism for the gin last receiving cotton from said feed mechanism and effective upon the presence thereat of more than a predetermined amount of cotton to deenergize the overflow discharge means and effective upon the presence therein of less than said predetermined amount of cotton to reactivate said overflow discharge means.

8. Apparatus as defined in claim 7 including means in said overflow hopper effective upon the presence of more than a predetermined amount of cotton therein to stop delivery of seed cotton to said conditioning mechanism.

9. Apparatus as defined in claim 7 including,
(a) means in said overflow hopper effective upon the presence of more than a predetermined amount of cotton in the overflow hopper to stop delivery of seed cotton to said conditioning mechanism, and
(b) a time delay mechanism activated by said means effective to energize the means for discharging cotton from the overflow hopper for delivery to the feed mechanism after a period of time sufficient to allow cotton already in said conditioning mechanism to be delivered to said feed mechanism, whereby a substantially uniform stream of cotton is delivered to the feed mechanism and supplied thereby to the gins.

References Cited by the Examiner
UNITED STATES PATENTS

| | | | |
|---|---|---|---|
| 1,875,356 | 9/1932 | Shaw | 19—97.5 |
| 3,111,718 | 11/1963 | Nutter et al. | 19—105 |

MERVIN STEIN, *Primary Examiner.*

I. C. WADDEY, *Assistant Examiner.*